(12) United States Patent
Choi et al.

(10) Patent No.: US 12,415,873 B2
(45) Date of Patent: Sep. 16, 2025

(54) METHOD FOR PREPARING LIQUID RUBBER AND LIQUID RUBBER PREPARED THEREFROM

(71) Applicant: LG Chem, Ltd., Seoul (KR)

(72) Inventors: Ji Hyun Choi, Daejeon (KR); Gyeong Shin Choi, Daejeon (KR); Won Hee Kim, Daejeon (KR); Jong Yeol Baek, Daejeon (KR); Hee Jeong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 889 days.

(21) Appl. No.: 17/625,576

(22) PCT Filed: Apr. 1, 2021

(86) PCT No.: PCT/KR2021/004074
§ 371 (c)(1),
(2) Date: Jan. 7, 2022

(87) PCT Pub. No.: WO2021/235678
PCT Pub. Date: Nov. 25, 2021

(65) Prior Publication Data
US 2022/0289875 A1    Sep. 15, 2022

(30) Foreign Application Priority Data
May 22, 2020  (KR) .................. 10-2020-0061492

(51) Int. Cl.
*C08F 4/602* (2006.01)
*C08F 136/06* (2006.01)
(Continued)

(52) U.S. Cl.
CPC .......... *C08F 4/6028* (2013.01); *C08F 136/06* (2013.01); *C08F 136/08* (2013.01); *C08F 236/10* (2013.01)

(58) Field of Classification Search
CPC .... C08F 4/6028; C08F 136/06; C08F 136/08; C08F 236/10; C08F 297/00; C08F 36/04;
(Continued)

(56) References Cited

U.S. PATENT DOCUMENTS

| 6,417,270 B1 * | 7/2002 | Wollum ................ C08F 297/04 525/271 |
| 2008/0161478 A1 * | 7/2008 | Yan .......................... C08C 19/44 524/500 |

(Continued)

FOREIGN PATENT DOCUMENTS

| CN | 101812151 A | 8/2010 |
| CN | 102459447 A | 5/2012 |

(Continued)

OTHER PUBLICATIONS

Brookhart, M., et al., "[(3,5-(CF3)2C6H3)4B]-[H(OEt2)2]+: A Convenient Reagent for Generation and Stabilization of Cationic, Highly Electrophilic Organometallic Complexes". Organometallics, (Jun. 1992), 11(11), pp. 3920-3922.

(Continued)

*Primary Examiner* — Doris L Lee
(74) *Attorney, Agent, or Firm* — Lerner David LLP (57) ABSTRACT

The present invention relates to a method for preparing a liquid rubber, and relates to a method for preparing a liquid rubber, including performing polymerization reaction of a conjugated diene-based monomer in the presence of an organic solvent and a catalyst composition (S10), wherein the catalyst composition includes a catalyst including a compound represented by the following Formula 1, and a liquid rubber prepared therefrom:

(Continued)

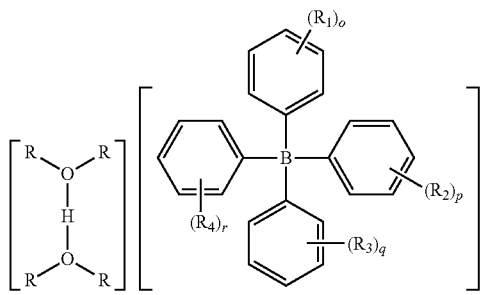

[Formula 1]

wherein R, $R_1$ to $R_4$, and o, p, q and r are described herein.

13 Claims, 3 Drawing Sheets (51) Int. Cl.
  *C08F 136/08* (2006.01)
  *C08F 236/10* (2006.01)
(58) Field of Classification Search
  CPC .. C08F 4/54; C08F 136/04; C08F 4/14; C08L 9/08; C08L 9/10
  See application file for complete search history.

(56) References Cited

U.S. PATENT DOCUMENTS

| 2008/0249264 A1 | 10/2008 | Hanefeld et al. |
| 2008/0249267 A1 | 10/2008 | Hanefeld et al. |
| 2010/0076107 A1 | 3/2010 | Kitano et al. |
| 2012/0041154 A1 | 2/2012 | Kitano et al. |
| 2017/0305192 A1 | 10/2017 | Yokoyama et al. |
| 2022/0127393 A1 | 4/2022 | Choi et al. |
| 2022/0195079 A1 | 6/2022 | Jo et al. |

FOREIGN PATENT DOCUMENTS

| CN | 102887966 A | 1/2013 |
| CN | 103059368 A | 4/2013 |
| CN | 103204973 A | 7/2013 |
| CN | 107805288 A | 3/2018 |
| CN | 108440698 A | 8/2018 |
| CN | 108690156 A | 10/2018 |
| CN | 110563861 A | 12/2019 |
| EP | 2420535 A1 | 2/2012 |
| JP | S61136507 A | 6/1986 |
| JP | H10139827 A | 5/1998 |
| JP | 2000344814 A | 12/2000 |
| JP | 2004346307 A | 12/2004 |
| JP | 2019031686 A | 2/2019 |
| JP | 2022519216 A | 3/2022 |
| JP | 2022531425 A | 7/2022 |
| KR | 20000037531 A | 7/2000 |
| KR | 20080070057 A | 7/2008 |
| KR | 20170068486 A | 6/2017 |
| WO | 03064484 A1 | 8/2003 |
| WO | 2010119708 A1 | 10/2010 |

OTHER PUBLICATIONS

Campora, J. et al., "Synthesis and Catalytic Activity of Cationic Allyl Complexes of Nickel Stabilized by a Single N-Heterocyclic Carbene Ligand," Organometallics, Jun. 2006, pp. 3314-3316, vol. 25.

International Search Report for Application No. PCT/KR2021/004074 mailed Jul. 19, 2021, pp. 1-3.

Jutzi, P. et al., "Synthesis, Crystal Structure, and Application of the Oxonium Acid [H(OEt2)2]+[B(C6F5)4]-," Organometallics, Mar. 2000, pp. 1442-1444, vol. 19.

Niu, Q. et al., "Synthesis of spherical trans-1,4-polyisoprene/trans-1,4-poly (butadiene-co-isoprene) rubber alloys within reactor," Polymer, Mar. 2014, pp. 2146-2152, vol. 55.

Partial Supplementary European Search Report including Written Opinion for Application No. 21809322.7 dated Dec. 20, 2022, pp. 1-14.

Shao Huafeng et al, "Synthesis and characterization of low relative molecular weight trans -1,4-poly(isoprene)", Journal of Applied Polymer Science, vol. 107, No. 6, Dec. 6, 2007 (Dec. 6, 2007), pp. 3734-3738, XP093265622, US ISSN: 0021-8995, DOI: 10.1002/app.27355.

Extended European Search Report including Written Opinion for Application No. 25151162.2 dated Apr. 10, 2025, 9 pages.

* cited by examiner

METHOD FOR PREPARING LIQUID RUBBER AND LIQUID RUBBER PREPARED THEREFROM

CROSS-REFERENCE TO RELATED APPLICATIONS

The present application is a national stage entry under 35 U.S.C. § 371 of International Application No. PCT/KR2021/004074 filed on Apr. 1, 2021, which claims priority from Korean Patent Application No. 10-2020-0061492, filed on May 22, 2020, all the disclosures of which are incorporated herein by reference.

TECHNICAL FIELD

The present invention relates to a method for preparing liquid rubber using cationic polymerization, and liquid rubber prepared therefrom.

BACKGROUND ART

Oils which are conventionally used as petroleum-based plasticizers, have a phthalate or aromatic structure, a small molecular weight and volatility, and accordingly, may be evaporated during compounding of rubber or discharged by bleeding or blooming phenomenon from rubber products during storing for a long time after compounding, and thus, the physical properties of rubber products may be changed. Particularly, in case of using a corresponding rubber in tires, etc., the oils are discharged together with the rubber due to the abrasion of the tires, and there are problems adversely affecting environments.

In this regard, recently, liquid rubber receives attention as a plasticizer. This is used as a substitute for a process oil for compounding rubber, and improves the processability of the rubber while being present in a stable state through vulcanization with solid rubber. In addition, the liquid rubber added like this is known to assist the enhancement of the physical properties of the rubber, together with the solid rubber.

Such liquid rubber may be generally prepared through ion polymerization, radical polymerization or coordination polymerization. Recently, as a method for preparing solid rubber, anionic polymerization and coordination polymerization are mostly used, and in order to prepare liquid rubber having a low molecular weight, a method of using an excessive amount of a catalyst when compared to the conventional polymerization is mostly used. However, when preparing liquid rubber, the control of heat generated at an initial stage of polymerization reaction is difficult due to the excessive amount of the catalyst, and there are problems of degrading the physical properties of the liquid rubber prepared. In addition, when preparing the liquid rubber, continuous polymerization is difficult to perform, and batch polymerization or semi-batch polymerization is mostly used, and it is difficult to increase the productivity. In addition, when preparing the liquid rubber, a large amount of the catalyst is required, and catalyst cost might increase, production cost might increase, and a large amount of the catalyst might remain in the liquid rubber prepared, resulting in difficult problems of insufficient removal of the catalyst.

Meanwhile, to solve such problems, a method of preparing rubber having a low molecular weight through scission by oxidation of rubber has been suggested, but it is not easy to reduce the molecular weight to a constant molecular weight, and rubber prepared thereby mostly showed high molecular weight distribution (PDI), and accordingly, there are difficult issues in expressing desired physical properties.

PRIOR ART DOCUMENT

Patent Document (Patent Document 1) KR10-2017-0068486A

DISCLOSURE OF THE INVENTION

Technical Problem

The present invention is devised to solve the problems of the conventional technique and an object is to provide a method for preparing a liquid rubber of a low molecular weight, having a high 1,4-trans bond ratio, from a very small amount of a catalyst composition by using cationic polymerization.

In addition, another object of the present invention is to provide a liquid rubber of a low molecular weight, prepared by the preparation method of a liquid rubber and having a high 1,4-trans bond ratio.

Technical Solution

In order to solve the above-described tasks, the present invention provides a method for preparing a liquid rubber, including performing polymerization reaction of a conjugated diene-based monomer in the presence of an organic solvent and a catalyst composition (S10), wherein the catalyst composition includes a catalyst including a compound represented by the following Formula 1:

[Formula 1]

in Formula 1, R is an alkyl group of 1 to 12 carbon atoms, $R_1$ to $R_4$ are each independently hydrogen, a halogen group, or a substituted or unsubstituted alkyl group of 1 to 20 carbon atoms, and o, p, q and r are each independently an integer of 1 to 5.

In addition, the present invention provides a liquid rubber including a conjugated diene-based monomer unit solely, or a conjugated diene-based monomer unit and an aromatic vinyl-based monomer unit, wherein a number average molecular weight is less than 100,000 g/mol, the liquid rubber is present in a liquid state at room temperature (23° C.±3° C.), and in case of comprising the conjugated diene-based monomer unit solely, a trans-1,4 bond ratio of the conjugated diene-based monomer unit is 75% or more, a cis-1,4 bond ratio is 1% or less, and other bonds are 1,2-bonds.

Advantageous Effects

In case of preparing a liquid rubber using cationic polymerization according to the preparation method of a liquid rubber of the present invention, a liquid rubber of a low molecular weight, having a high 1,4-trans bond ratio may be prepared from a very small amount of a catalyst composition.

BEST NODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms used in the present invention may be defined as follows unless otherwise separately defined.

The term "liquid rubber" in the present invention may mean a polymer of a low molecular weight, showing a rubber phase, or may be a rubber which has a number average molecular weight of less than 100,000 g/mol and is present in a liquid phase at room temperature (23° C.±3° C.). Here, the liquid phase means that a rubber shows fluidity as a rubber itself from which a solvent is removed.

The term "substituted" in the present invention may mean that the hydrogen of a functional group, an atomic group or a compound is substituted with a specific substituent, and in case where the hydrogen of a functional group, an atomic group or a compound is substituted with a specific substituent, one or multiple substituents of two or more may be present according to the number of hydrogen present in the functional group, atomic group or compound, and in case where multiple substituents are present, each substituent may be the same or different.

The term "monovalent hydrocarbon group" in the present invention may mean a substituent which is mono-substituted with an atomic group including carbon and hydrogen atoms, and in a particular embodiment, may mean including all of an alkyl group, an alkylene group, an alkynyl group, a cycloalkyl group and an aryl group including carbon and hydrogen atoms.

The term "alkyl group" in the present invention may mean a monovalent aliphatic saturated hydrocarbon group, and may mean including all of a linear alkyl group such as methyl, ethyl, propyl and butyl; a branch type alkyl group such as isopropyl, sec-butyl, tert-butyl and neo-pentyl; and a cyclic saturated hydrocarbon group, or a cyclic unsaturated hydrocarbon group including one or two or more unsaturated bonds.

The term "monomer unit" used in the present invention may mean a repeating unit formed through the participation of a compound used as a monomer in polymerization reaction, a structure derived therefrom, or the material itself.

The present invention provides a method for preparing a liquid rubber.

According to an embodiment of the present invention, the method for preparing a liquid rubber includes performing polymerization reaction of a conjugated diene-based monomer in the presence of an organic solvent and a catalyst composition (S10), wherein the catalyst composition may include a catalyst including a compound represented by Formula 1 below.

[Formula 1]

In Formula 1, R may be an alkyl group of 1 to 12 carbon atoms, $R_1$ to $R_4$ may be each independently hydrogen, a halogen group, or a substituted or unsubstituted alkyl group of 1 to 20 carbon atoms, and o, p, q and r may be each independently an integer of 1 to 5.

According to an embodiment of the present invention, R may be an alkyl group of 1 to 10 carbon atoms, and $R_1$ to $R_4$ may be each independently hydrogen, a halogen group, or a halogen-substituted alkyl group of 1 to 10 carbon atoms.

In addition, according to an embodiment of the present invention, R may be a methyl group, an ethyl group, a propyl group, an iso-propyl group, a n-butyl group, an iso-butyl group or a t-butyl group, and $R_1$ to $R_4$ may be each independently hydrogen, chlorine, bromine, fluorine, iodine or trifluoromethyl.

In addition, according to an embodiment of the present invention, an organic borate in the compound represented by Formula 1 may be one or more selected from the group consisting of tetrakis(phenyl)borate, tetrakis(pentafluorophenyl)borate, tetrakis[3,5-bis(trifluoromethyl)phenyl]borate and derivatives thereof, and in this case, cationic polymerization of a conjugated diene-based polymer from a very small amount of a catalyst composition is possible, position selectivity on a trans-1,4 bond is high, and the preparation of a liquid rubber having a high trans-1,4 bond ratio is possible.

In addition, according to an embodiment of the present invention, the catalyst composition may include an aluminum-based cocatalyst.

The catalyst composition of the present invention is suitable to use for the preparation of a conjugated diene-based polymer by cationic polymerization. In case of the cationic polymerization, it may be important to stabilize a cationic moiety formed during polymerization reaction, the catalyst may, by the sole catalyst or by forming a composite such as a strong Lewis acid through the combination with an aluminum-based cocatalyst, play the role of effectively stabilizing a cationic moiety, and the preparation of a conjugated diene-based polymer of a low molecular weight may be possible.

According to an embodiment of the present invention, the aluminum-based cocatalyst may be one or more selected from aluminum-based compounds represented by Formula 2 to Formula 4 below.

[Formula 2]

$(R_a)_m Al(A)_{3-m}$

[Formula 3]

[Formula 4]

In Formulae 2 to 4, $R_a$, $R_5$ and $R_6$ may be each independently a monovalent hydrocarbon group of 1 to 20 carbon atoms, Z may be a halogen group, m may be an integer of 0 to 3, and a and b may be each independently an integer of 1 to 100.

According to an embodiment of the present invention, in Formulae 2 to 4, $R_a$, $R_5$ and $R_6$ may be each independently a monovalent hydrocarbon group of 1 to 10 carbon atoms, Z may be a halogen group, m may be an integer of 1 to 3, and a and b may be each independently an integer of 2 to 50.

In a particular embodiment, in Formula 2, each $R_a$ may be an alkyl group of 1 to 12 carbon atoms, a cycloalkyl group of 3 to 12 carbon atoms or an aryl group of 6 to 12 carbon atoms, preferably, an alkyl group of 1 to 12 carbon atoms, an alkyl group of 1 to 6 carbon atoms, an alkyl group of 1 to 3 carbon atoms, or an ethyl group, Z may preferably be a chlorine atom or a bromine atom, preferably, a chlorine atom, and m may be an integer of 2 or 3, preferably, 3.

In addition, in a particular embodiment, in Formulae 3 and 4, $R_5$ and $R_6$ may be each independently an alkyl group of 1 to 12 carbon atoms, a cycloalkyl group of 3 to 12 carbon atoms or an aryl group of 6 to 12 carbon atoms.

According to an embodiment of the present invention, the aluminum-based cocatalyst may be one or more selected from the group consisting of methylaluminoxane, modified methylaluminoxane, trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, tri-2-ethylhexylaluminum, dimethylaluminum chloride, diethylaluminum chloride, diisopropylaluminum chloride, diisobutylaluminum chloride, dimethylaluminum bromide, methylaluminum dichloride, ethylaluminum dichloride, isopropylaluminum dichloride, aluminum chloride and ethylaluminum dibromide.

In addition, according to an embodiment of the present invention, the aluminum-based cocatalyst may be one or more aluminoxanes selected from the group consisting of methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane and 2,6-dimethylphenyl aluminoxane.

In addition, according to an embodiment of the present invention, the modified methylaluminoxane is methylaluminoxane of which methyl group is substituted with a modifier group ($R_7$), particularly, a hydrocarbon group of 2 to 20 carbon atoms, and may particularly be a compound represented by Formula 5 below.

[Formula 5]

$$-\!\!+\!\!Al\!-\!\!O\!\!\overset{}{\underset{\substack{|\\Me}}{\rightarrow_c}}\!\!+\!\!Al\!-\!\!O\!\!\overset{}{\underset{\substack{|\\R_7}}{\rightarrow_d}}\!\!-$$

In Formula 5, $R_7$ is the same as the above-defined $R_5$, c and d may be each independently an integer of 2 or more, and Me represents a methyl group.

In a particular embodiment, in Formula 5, $R_7$ may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group or an alkynyl group of 2 to 20 carbon atoms, more particularly, an alkyl group of 2 to 10 carbon atoms such as an ethyl group, an isobutyl group, a hexyl group and an octyl group, more particularly, an isobutyl group.

In a more particular embodiment, in the modified methylaluminoxane, about 50 mol % to 90 mol % of the methyl group of the methylaluminoxane may be substituted with the hydrocarbon group. The modified methylaluminoxane may be prepared by a common method, particularly, using an alkylaluminum other than trimethylaluminum and trimethylaluminum. In this case, the alkylaluminum may be triisobutylaluminum, triethylaluminum, trihexylaluminum, trioctylaluminum, or the like, and among them, any one or a mixture of two or more thereof may be used.

According to an embodiment of the present invention, when polymerizing a conjugated diene-based monomer, particularly, an isoprene monomer, the isoprene monomer may be bonded to a cationic chain under polymerizing to form a resonance structure, and the additional reaction of cations may be degraded, and it is apprehended that additional polymerization may be performed very slowly, or termination reaction may occur. In view of this, it is important that a catalyst, or a catalyst and a cocatalyst, having high reactivity is selected and used so as to block early termination. The catalyst and cotatalyst, used in the present invention form a composite such as a strong Lewis acid due to the catalyst solely, or the combination of the catalyst and the cocatalyst, and a catalyst system may show high activity during polymerizing the conjugated diene-based monomer, and accordingly, a liquid rubber of a low molecular weight, having a high 1,4-trans bond ratio may be prepared from a very small amount of a catalyst composition.

According to an embodiment of the present invention, a weight ratio of the catalyst including the compound represented by Formula 1 and the aluminum-based cocatalyst may be 1:0.1 to 1:50, 1:0.2 to 1:30, 1:0.5 to 1:8, or 1:1 to 1:10, and within this range, catalyst activation through the cocatalyst may be sufficiently carried out, and cationic polymerization may be efficiently performed.

In addition, according to an embodiment of the present invention, the catalyst composition may include a solvent. In a particular embodiment, the solvent may be a halogenated hydrocarbon solvent, in a more particular embodiment, may be one or more selected from the group consisting of chloromethane, dichloromethane, trichloromethane, 1-chlorobutane and chlorobenzene.

According to an embodiment of the present invention, step (S10) is a step for performing cationic polymerization of a conjugated diene-based monomer from the catalyst composition, and the conjugated diene-based monomer may be one or more selected from the group consisting of 1,3-butadiene, 2,3-dimethyl-1,3-butadiene, piperylene, 3-butyl-1,3-octadiene, isoprene and 2-phenyl-1,3-butadiene. In a particular embodiment, the conjugated diene-based monomer may be 1,3-butadiene or isoprene, in a more particular embodiment, may be isoprene.

According to an embodiment of the present invention, the organic solvent may be a nonpolar organic solvent, a polar aprotic solvent, or a mixture thereof. In another embodiment, the organic solvent may be a hydrocarbon solvent, a halogenated hydrocarbon solvent or a mixture thereof.

According to an embodiment of the present invention, the hydrocarbon solvent may be an aliphatic hydrocarbon solvent or an aromatic hydrocarbon solvent, in a particular embodiment, the aliphatic hydrocarbon solvent may be one or more selected from the group consisting of butane, pentane, neopentane, hexane, cyclohexane, methylcyclohexane, heptane, and octane. The aromatic hydrocarbon solvent may be one or more selected from the group consisting of benzene, toluene, xylene and ethylbenzene.

In addition, according to an embodiment of the present invention, the halogenated hydrocarbon solvent may be one or more selected from the group consisting of chloromethane, dichloromethane, trichloromethane, 1-chlorobutane and chlorobenzene.

In case of using a mixture of a hydrocarbon solvent and a halogenated hydrocarbon solvent as an organic solvent in the present invention, a mixing ratio may be 10:1 to 1:10 in a weight ratio, particularly, 5:1 to 1:5 in a weight ratio.

According to an embodiment of the present invention, the catalyst composition may be 0.1 parts by weight or less, 0.05 parts by weight or less, 0.01 parts by weight to 0.05 parts by weight, or 0.01 parts by weight to 0.02 parts by weight based on 100 parts by weight of the organic solvent and the conjugated diene-based monomer, and within this range, cationic polymerization reaction may be efficiently performed even with a very small amount.

According to an embodiment of the present invention, the polymerization in step (S10) may be performed at 0° C. to 50° C., 10° C. to 30° C., 20° C. to 30° C., or at room temperature (23±3° C.), and within this range, the activity of the catalyst may be excellent, and a molecular weight for preparing a liquid rubber may be secured. In addition, the polymerization in step (S10) may be performed for 10 minutes to 3 hours, 10 minutes to 1 hour, or 20 minutes to 40 minutes.

In addition, according to an embodiment of the present invention, the polymerization in step (S10) may be performed by including an aromatic vinyl-based monomer. In another embodiment, the preparation method of the liquid rubber may include a step of performing polymerization reaction of an aromatic vinyl-based monomer in the presence of an organic solvent and a catalyst composition (S1), prior to step (S10). The aromatic vinyl-based monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene.

According to an embodiment of the present invention, in case of performing the polymerization in step (S10) by including the aromatic vinyl-based monomer, the liquid rubber thus prepared may be a random copolymer including a conjugated diene-based monomer unit and an aromatic vinyl-based monomer unit. In case of including the step of performing polymerization reaction of the aromatic vinyl-based monomer in the presence of an organic solvent and a catalyst composition (S1) prior to step (S10), the liquid rubber thus prepared may be a block copolymer including a poly conjugated diene block and a poly aromatic vinyl-based block.

According to an embodiment of the present invention, in case where the liquid rubber includes the random copolymer or the block copolymer, including the aromatic vinyl-based monomer unit, each copolymer may include 10 wt % to 90 wt %, 20 wt % to 80 wt %, or 30 wt % to 70 wt % of the conjugated diene-based monomer unit, and 10 wt % to 90 wt %, 20 wt % to 80 wt %, or 30 wt % to 70 wt % of the aromatic vinyl-based monomer unit.

The preparation method of the liquid rubber according to an embodiment of the present invention may include a step of removing the catalyst (S20) after step (S10). According to an embodiment of the present invention, the catalyst composition may be efficiently removed physically through a step of simple filtering and adsorption, and the use and removal thereof is more favorable when compared to the Lewis acid catalyst of the conventional technique.

According to an embodiment of the present invention, in step (S20), after polymerizing a liquid rubber, the organic solvent may be removed, and the organic solvent may be controlled to 40 wt % or less, 20 wt % or less, or 5 wt % or less of an oligomer or polymer. Then, in case of a polymer having fluidity, a step of filtering and adsorbing an insoluble material may be performed by using a glass filter having 80 mesh or more, 100 mesh or more, or 200 mesh or more. Otherwise, the catalyst may be removed by passing through the polymer having fluidity using a silica, celite or zeolite filter.

In addition, according to an embodiment of the present invention, in case of a polymer having low fluidity, fluidity is provided using one or more selected from the group consisting of a linear alkyl solvent, for example, pentane, cyclopentane, hexane, cyclohexane, heptane and octane, and an ether solvent, for example, diethyl ether and petroleum ether, and then, a step of filtering and adsorbing through the glass filter, a silica filter, a celite filter or a zeolite filter may be performed.

In addition, according to an embodiment of the present invention, the polymer polymerized in step (S10) may be dissolved in an organic solvent including pentane, cyclopentane, hexane, cyclohexane, heptane, octane, diethyl ether or petroleum ether, and washed to remove the catalyst.

In addition, according to an embodiment of the present invention, from the polymer polymerized in step (S10), the catalyst including the compound represented by Formula 1 may be efficiently removed through a simple filtering and adsorption step, and a separate washing step may not be performed.

In addition, according to an embodiment of the present invention, the preparation method of the liquid rubber may further include a step of drying residual solvents (S30) after step (S20). In a particular embodiment, the drying temperature in step (S30) may be 30° C. to 200° C., or 40° C. to 150° C., and a vacuum degree may be 300 torr or less, 200 torr or less, or 100 torr or less. Through this, a target liquid rubber may be efficiently obtained.

In addition, the present invention provides a liquid rubber which is prepared according to the preparation method of a liquid rubber and includes a conjugated diene-based monomer unit. The liquid rubber includes a conjugated diene-based monomer unit solely, or a conjugated diene-based monomer unit and an aromatic vinyl-based monomer unit, has a number average molecular weight of less than 100,000 g/mol, and is present in a liquid state at room temperature (23° C.±3° C.). In case of including the conjugated diene-based monomer unit solely, a trans-1,4 bond ratio of the conjugated diene-based monomer unit may be 75% or more, a cis-1,4 bond ratio may be 1% or less, and other bonds may be 1,2-bonds.

According to an embodiment of the present invention, the liquid rubber may include a diene-based polymer including a conjugated diene-based monomer unit solely, or a copolymer including a conjugated diene-based monomer unit and an aromatic vinyl-based monomer unit. According to an embodiment of the present invention, the conjugated diene-based monomer may be the same as the above-described conjugated diene-based monomer.

According to an embodiment of the present invention, a trans-1,4 bond ratio of the conjugated diene-based monomer unit may be 75 mol % or more, a cis-1,4 bond ratio may be 1 mol % or less, and other bonds may be 1,2-bonds.

Figure 1:
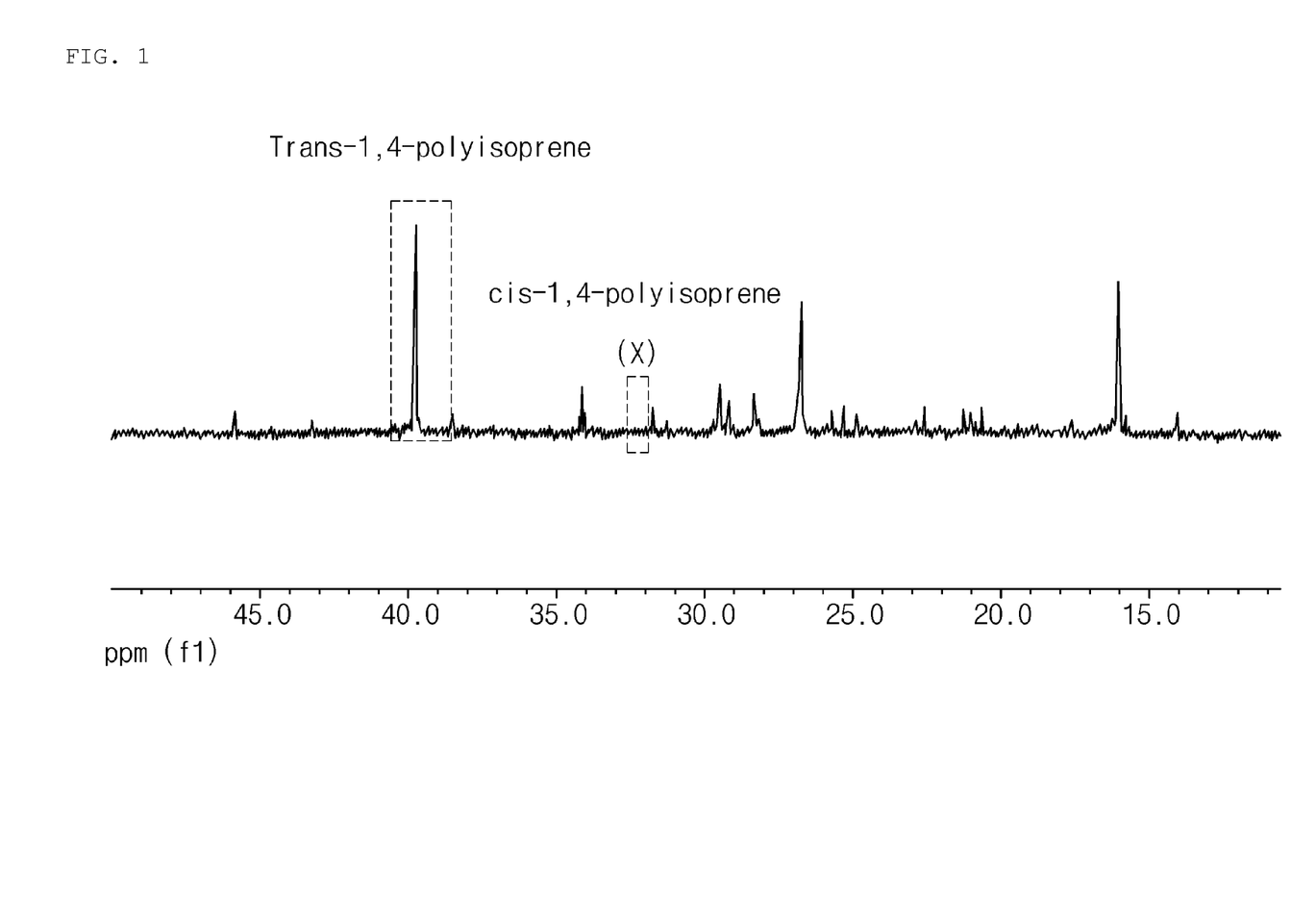
FIG. 1 is a $^{13}$C spectrum of a liquid rubber including a polyisoprene polymer according to an embodiment of the present invention.

According to an embodiment of the present invention, if the conjugated diene-based monomer is isoprene, a trans-1,4 bond ratio of the isoprene unit may be 90 mol % or more, 95 mol % or more, 98 mol % or more, or 98 mol % to 100 mol %. Particularly, if the conjugated diene-based monomer is isoprene, a cis-1,4 bond may not be present in an isoprene unit. This could be confirmed from $^{13}C$ spectrum as shown in FIG. 1.

Figure 2:
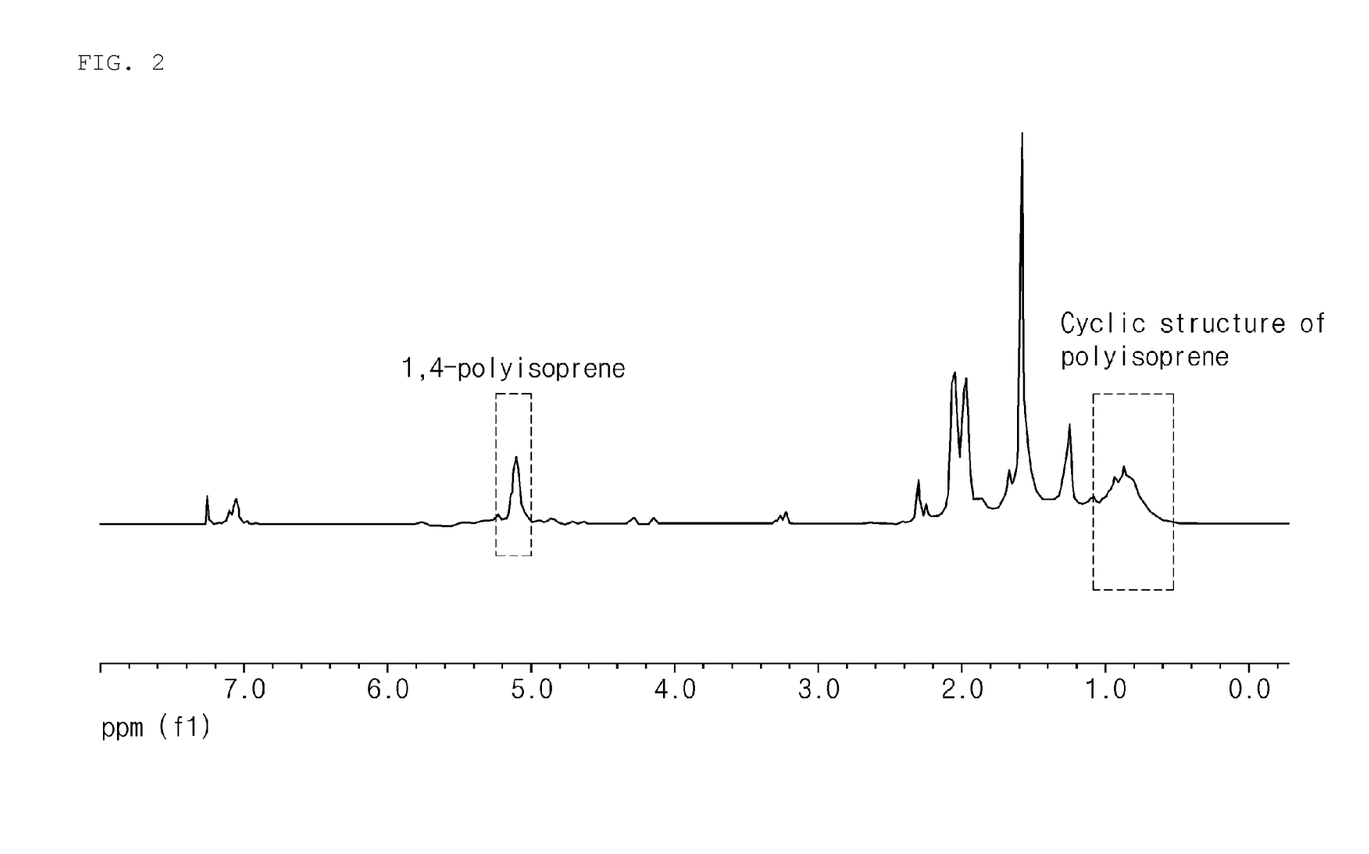
FIG. 2 is a $^1$H NMR spectrum of a liquid rubber including a polyisoprene polymer according to an embodiment of the present invention.

In addition, according to an embodiment of the present invention, if the conjugated diene-based monomer is isoprene, a structure by 1,2-addition reaction may be partially formed in addition to the trans-1,4 bond, and in this case, as shown in Reaction 1 below, due to tertiary carbocation formed during polymerization, a cyclic structure may be formed between 1,2-added monomer units. Accordingly, a polyisoprene polymerized by the preparation method of a liquid rubber of the present invention may include a cyclic structure, and thus, the physical properties such as thermal properties and viscosity properties of the polyisoprene may be changed. This could be confirmed from $^{1}H$ NMR spectrum as shown in FIG. 2.

[Reaction 1]

In addition, according to an embodiment of the present invention, if the conjugated diene-based monomer is 1,3-butadiene, a trans-1,4 bond ratio of a 1,3-butadiene unit may be 75% or more, 75% to 90%, or 78% to 90%, a cis-1,4 bond ratio may be 1% or less, and other bonds may be 1,2-bonds.

In addition, according to an embodiment of the present invention, the liquid rubber may include a diene-based polymer having a weight average molecular weight of 1,000 g/mol to 20,000 g/mol, and a number average molecular weight of 1,000 g/mol to 6,000 g/mol.

In a particular embodiment, if the conjugated diene-based monomer of the diene-based polymer is isoprene, a weight average molecular weight may be 1,000 g/mol to 20,000 g/mol, 2,000 g/mol to 18,000 g/mol, or 3,000 g/mol to 16,000 g/mol, a number average molecular weight may be 1,000 g/mol to 6,000 g/mol, 1,500 g/mol to 6,000 g/mol, or 2,000 g/mol to 6,000 g/mol, and molecular weight distribution may be 1.00 to 5.00, 1.20 to 4.50, or 1.50 to 4.20.

In addition, in a particular embodiment, if the conjugated diene-based monomer of the diene-based polymer is 1,3-butadiene, a weight average molecular weight may be 1,000 g/mol to 20,000 g/mol, 3,000 g/mol to 10,000 g/mol, or 5,000 g/mol to 7,000 g/mol, a number average molecular weight may be 1,000 g/mol to 6,000 g/mol, 1,500 g/mol to 5,000 g/mol, or 2,000 g/mol to 3,000 g/mol, and molecular weight distribution may be 1.00 to 5.00, 2.00 to 4.00, or 2.30 to 3.00.

Here, the weight average molecular weight and the number average molecular weight are polystyrene converted molecular weights analyzed by gel permeation chromatography (GPC), and the molecular weight distribution is calculated from the ratio of (weight average molecular weight)/(number average molecular weight).

In addition, according to an embodiment of the present invention, if the liquid rubber includes the aromatic vinyl-based unit, the liquid rubber may be a random copolymer including a conjugated diene-based monomer unit and an aromatic vinyl-based monomer unit, or a block copolymer including a poly conjugated diene block and a poly aromatic vinyl-based block. According to an embodiment of the present invention, the aromatic vinyl-based monomer may be the same as the above-described aromatic vinyl-based monomer.

In a particular embodiment, the random copolymer including the conjugated diene-based monomer unit and the aromatic vinyl-based monomer unit may be a polystyrene-rand-polyisoprene copolymer, and in this case, a weight average molecular weight may be 1,000 g/mol to 20,000 g/mol, 3,000 g/mol to 10,000 g/mol, or 5,000 g/mol to 7,000 g/mol, a number average molecular weight may be 1,000 g/mol to 6,000 g/mol, 1,500 g/mol to 5,000 g/mol, or 2,000 g/mol to 3,000 g/mol, and molecular weight distribution may be 1.00 to 5.00, 2.00 to 4.00, or 2.30 to 3.00.

In addition, in a particular embodiment, the block copolymer including the poly conjugated diene block and the poly aromatic vinyl-based block may be a polystyrene-b-polyisoprene block copolymer, and in this case, a weight average molecular weight may be 1,000 g/mol to 20,000 g/mol, 2,000 g/mol to 20,000 g/mol, or 2,400 g/mol to 20,000 g/mol, a number average molecular weight may be 1,000 g/mol to 6,000 g/mol, 1,000 g/mol to 5,000 g/mol, or 1,100 g/mol to 2,700 g/mol, and molecular weight distribution may be 1.00 to 5.00, 2.00 to 4.00, or 2.00 to 2.50.

Figure 3:
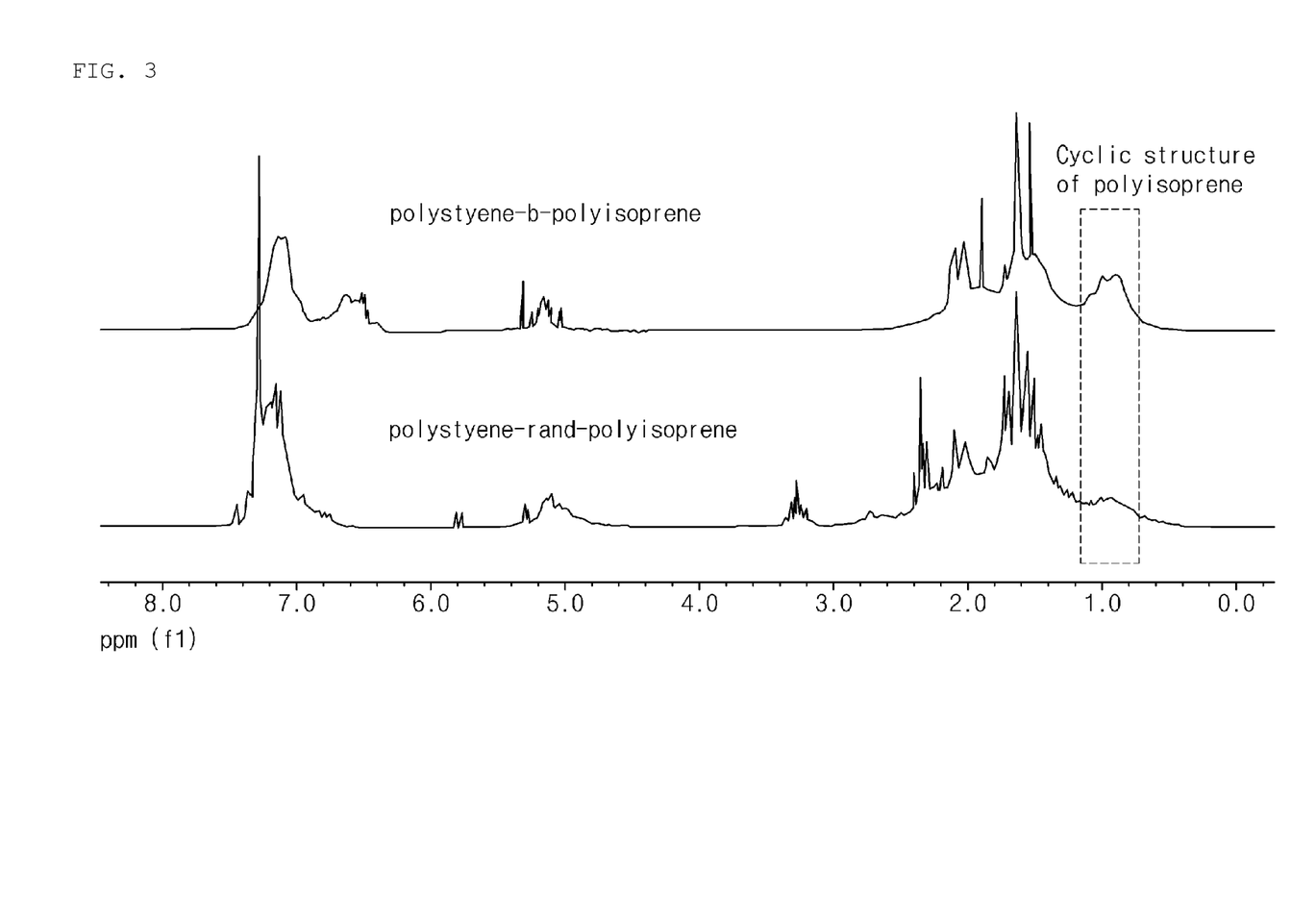
FIG. 3 is a $^1$H NMR spectrum of a liquid rubber including a polystyrene-b-polyisoprene copolymer and a polystyrene-rand-polyisoprene copolymer according to an embodiment of the present invention.

In addition, according to an embodiment of the present invention, in the random copolymer and block copolymer, including the aromatic vinyl-based monomer, if the conjugated diene-based monomer is isoprene, a structure by 1,2-addition reaction may be partially formed in addition to a trans-1,4 bond in the conjugated diene-based monomer unit, and in this case, as shown in Reaction 1, a cyclic structure may be formed between 1,2-added monomer units due to tertiary carbocation formed during polymerization, and accordingly, the polystyrene-rand-polyisoprene copolymer and polystyrene-b-polyisoprene block copolymer, polymerized by the preparation method of a liquid rubber of the present invention may include a cyclic structure. This could be confirmed in $^1$H NMR spectrum as shown in FIG. 3.

Hereinafter, the present invention will be described in detail so that a person skilled in the art could easily perform. However, the present invention may be embodied in various different types, and the invention is not limited to the embodiments explained herein.

PREPARATION EXAMPLE

In a glove box, 100 mg of [H(Et$_2$O)$_2$][B(C$_6$F$_5$)$_4$] (Ashai Glass Co.) was put together with a magnetic bar in a vial and dissolved in 2 mL of dichloromethane. Then, 3 equivalents of dibutyl ether (purchased from Aldrich) were injected thereto, followed by stirring in vacuum conditions for 30 minutes to prepare a catalyst composition.

EXAMPLES

Examples 1-1 to 1-5

To a 0.5 L, reaction flask dried in a glove box, a magnetic bar was put, and a solvent was injected in an amount described in Table 1 below. Then, isoprene was injected in an amount described in Table 1 below using a syringe, followed by stirring for 10 minutes. Then, the catalyst composition prepared in the Preparation Example was injected into the reaction flask, polymerization reaction was performed at 23° C. for 30 minutes, 1 g of methanol was injected to terminate the reaction, and the solvent was removed to obtain a liquid rubber. The yield was calculated from the amount of the liquid rubber obtained in contrast to the amount of the monomer injected.

Comparative Examples 1-1 to 1-3

To a 0.5 L, reaction flask dried in a glove box, a magnetic bar was put, and a solvent was injected in an amount described in Table 2 below. Then, isoprene was injected in an amount described in Table 2 below using a syringe, followed by stirring for 10 minutes. Then, n-butyllithium as a catalyst was dissolved in the same solvent injected above and injected into the reaction flask, polymerization reaction was performed for 1 hour, 1 g of methanol was injected to terminate the reaction, and the solvent was removed to obtain a liquid rubber. The yield was calculated from the amount of the liquid rubber obtained in contrast to the amount of the monomer injected.

TABLE 1

| Division | | Example 1-1 | 1-2 | 1-3 | 1-4 | 1-5[3] |
|---|---|---|---|---|---|---|
| Solvent | Type | Toluene | MC[2] | Toluene | Toluene | MC[2]/Toluene |
|  | Amount (wt %) | 80 | 80 | 60 | 60 | 60 |
| Monomer | Type | IP[1] | IP[1] | IP[1] | IP[1] | IP[1] |
|  | Amount (wt %) | 20 | 20 | 40 | 40 | 40 |
| Catalyst | Type | Preparation Example | Preparation Example | Preparation Example | Preparation Example | Preparation Example |
|  | Catalyst injection amount (parts by weight) in contrast to 100 parts by weight of monomer | 0.01 | 0.01 | 0.01 | 0.02 | 0.01 |
| Yield (%) | | >99 | >99 | >99 | >99 | >99 |

[1]IP: Isoprene
[2]MC: Dichloromethane
[3]MC:toluene weight ratio = 1:1

TABLE 2

| Division | | Comparative Example 1-1 | 1-2 | 1-3 |
|---|---|---|---|---|
| Solvent | Type | Toluene | Hexane | MC[2] |
|  | Amount (wt %) | 80 | 80 | 80 |
| Monomer | Type | IP[1] | IP[1] | IP[1] |
|  | Amount (wt %) | 20 | 20 | 20 |
| Catalyst | Type | n-BuLi | n-BuLi | n-BuLi |
|  | Catalyst injection amount (parts by weight) in contrast to 100 parts by weight of monomer | 0.01 | 0.01 | 0.01 |
| Yield (%) | | 97 | 15 | — |

[1]IP: Isoprene
[2]MC: Dichloromethane

Example 2

To a 0.5 L, Andrew flask dried in a glove box, a magnetic bar was put, and 1,3-butadiene was injected in an amount described in Table 3 below, followed by condensing at −20° C. Then, a solvent was injected into the Andrew flask in an amount described in Table 3 below using a syringe, followed by stirring while raising the temperature to 23° C. Then, the catalyst composition prepared in the Preparation Example was injected into the Andrew flask, polymerization reaction was performed at 23° C. for 60 minutes, 1 g of methanol was injected to terminate the reaction, and the solvent was removed to obtain a liquid rubber. The yield was calculated from the amount of the liquid rubber obtained in contrast to the amount of the monomer injected.

TABLE 3

| Division | | Example 2 |
|---|---|---|
| Solvent | Type | MC[2] |
| | Amount (wt %) | 80 |
| Monomer | Type | BD[4] |
| | Amount (wt %) | 20 |
| Catalyst injection amount (parts by weight) in contrast to 100 parts by weight of monomer | | 0.05 |
| Yield (%) | | 75 |

[2]MC: Dichloromethane
[4]BD: 1,3-butadiene

Example 3-1

To a 0.5 L, reaction flask dried in a glove box, a magnetic bar was put, and a solvent was injected in an amount described in Table 4 below. Then, styrene and isoprene were injected in amounts described in Table 4 below using a syringe, followed by stirring for 10 minutes. Then, the catalyst composition prepared in the Preparation Example was injected into the reaction flask, polymerization reaction was performed at 23° C. for 10 minutes, 1 g of methanol was injected to terminate the reaction, and the solvent was removed to obtain a liquid rubber. The yield was calculated from the amount of the liquid rubber obtained in contrast to the amount of the monomer injected.

Examples 3-2 and 3-3

To a 0.5 L, reaction flask dried in a glove box, a magnetic bar was put, and a solvent was injected in an amount described in Table 4 below. Then, styrene was injected in an amount described in Table 4 below using a syringe, followed by stirring for 10 minutes. Then, the catalyst composition prepared in the Preparation Example was injected into the reaction flask, polymerization reaction was performed at 23° C. for 10 minutes, and isoprene was injected in an amount described in Table 4 below using a syringe, followed by stirring for 10 minutes. After that, 1 g of methanol was injected to terminate the reaction, and the solvent was removed to obtain a liquid rubber. The yield was calculated from the amount of the liquid rubber obtained in contrast to the amount of the monomer injected.

TABLE 4

| Division | | Example 3-1 | Example 3-2 | Example 3-3 |
|---|---|---|---|---|
| Solvent | Type | Toluene | MC[2] | Toluene |
| | Amount (wt %) | 80 | 80 | 80 |
| Monomer | Type | SM[5] | SM[5] | SM[5] |
| | Amount (wt %) | 10 | 10 | 10 |
| | Type | IP[1] | IP[1] | IP[1] |
| | Amount (wt %) | 10 | 10 | 10 |
| Catalyst injection amount (parts by weight) in contrast to 100 parts by weight of monomer | | 0.05 | 0.05 | 0.05 |
| Yield (%) | | >99 | >99 | >99 |
| Copolymer structure[6] | | PS-rand-PIP | PS-b-PIP | PS-b-PIP |

[1]IP: Isoprene
[2]MC: Dichloromethane
[5]SM: Styrene
[6]rand is random copolymer, and b is block copolymer

EXPERIMENTAL EXAMPLES

Experimental Example 1

The number average molecular weight, the weight average molecular weight, the molecular weight distribution and the trans-1,4 bond content of each of the liquid rubbers obtained in Examples 1-1 to 1-5 and Comparative Examples 1-1 to 1-3 were measured by the methods below and are shown in Tables 5 and 6.
(1) Number Average Molecular Weight, Weight Average Molecular Weight, and Molecular Weight Distribution Measurement was conducted under gel permeation chromatography (GPC) analysis conditions below, a number average molecular weight (Mn), a weight average molecular weight (Mw), and a peak molecular weight (Mp) were measured, and molecular weight distribution was calculated from the value of (weight average molecular weight)/(number average molecular weight).
Column: PL MiniMixed B×2
Solvent: THF
Flow rate: 0.3 ml/min
Specimen concentration: 2.0 mg/ml
Injection amount: 10 μL
Column temperature: 40° C.
Detector: Agilent RI detector
Standard: polystyrene (corrected by a cubic function)
Data processing: ChemStation
(2) Trans-1,4 Bond Content Each of the liquid rubbers obtained in the Examples and Comparative Examples was dissolved in $CDCl_3$ which is a solvent for measuring NMR, $^1H$ NMR was measured using 500 MHz NMR of Varian Co., and according to the bonding position, a trans-1,4 bond and a cis-1,4 bond were confirmed. According to mathematical Equation 1 below, the trans-1,4 bond content (mol %) was calculated. The cis-1,4 bond content and 1,2-unit bond content of the Comparative Examples were calculated by the same method.

Trans-1,4 bond content (mol %)=(trans-1,4 bond content (mol))/(total content of conjugated diene bond produced (mol))×100    [Mathematical Equation 1]

TABLE 5

| | Division | Example 1-1 | Example 1-2 | Example 1-3 | Example 1-4 | Example 1-5 |
|---|---|---|---|---|---|---|
| Molecular weight | Mn (g/mol) | 2,146 | 5,622 | 2,632 | 2,562 | 3,784 |
| | Mw (g/mol) | 3,377 | 14,566 | 8,592 | 7,293 | 15,727 |
| | PDI | 1.57 | 2.59 | 3.26 | 2.84 | 4.15 |

TABLE 5-continued

|  |  | Example | | | | |
|---|---|---|---|---|---|---|
| Division | | 1-1 | 1-2 | 1-3 | 1-4 | 1-5 |
| Bond type | trans-1,4 bond content (mol %) | >98 | >98 | >98 | >98 | >98 |
| | cis-1,4 bond content (mol %) | <1 | <1 | <1 | <1 | <1 |
| | 1,2-unit bond content (mol %) | <1 | <1 | <1 | <1 | <1 |
| Polymer state at room temperature | | Liquid | Liquid | Liquid | Liquid | Liquid |

TABLE 6

|  |  | Comparative Example | | |
|---|---|---|---|---|
| Division | | 1-1 | 1-2 | 1-3 |
| Molecular weight | Mn (g/mol) | 42,940 | 21,944 | — |
| | Mw (g/mol) | 48,310 | 31,185 | — |
| | PDI | 1.1 | 1.4 | — |
| Bond type | trans-1,4 bond content (mol %) | 5 | 4 | — |
| | cis-1,4 bond content (mol %) | 75 | 76 | — |
| | 1,2-unit bond content (mol %) | 20 | 20 | — |
| Polymer state at room temperature | | Liquid | Liquid | — |

As shown in Tables 5 and 6, according to the present invention, it could be confirmed that a liquid rubber having high selectivity on a trans-1,4 bond was obtained in a high yield by using a small amount of a catalyst.

Meanwhile, in case of anionic polymerization using n-butyllithium as in Comparative Examples 1-1 and 1-2, it could be confirmed that the cis-1,4 bond content was very high, and the trans-1,4 bond selectivity was extremely low. In addition, though the same amount of the catalyst was injected in contrast to the Examples, rubbers having a molecular weight of four to twenty times were prepared, and it could be confirmed that in order to prepare a liquid rubber having a similar degree of molecular weight, ten or more times the catalyst is required. Further, in case of injecting ten or more times the catalyst, it is expected that defects on controlling heating due to the catalyst might be generated. In addition, in case of Comparative Example 1-3, polymerization could not be performed on a dichloromethane solvent.

Experimental Example 2

With respect to the liquid rubber obtained in Example 2, the number average molecular weight, the weight average molecular weight, the molecular weight distribution, the trans-1,4 bond content and the 1,2-unit bond content were measured by the same methods as in Experimental Example 1, and are shown in Table 7 below. Here, the 1,2-unit bond content was calculated from the remaining amount excluding the trans-1,4 bond content and the cis-1,4 bond content from the total content of the conjugated diene bond produced.

TABLE 7

|  |  | Example |
|---|---|---|
| Division | | 2 |
| Molecular weight | Mn(g/mol) | 2,576 |
| | Mw(g/mol) | 6,678 |
| | PDI | 2.59 |
| Bond type | trans-1,4 bond content (mol %) | 78 |
| | cis-1,4 bond content (mol %) | 0 |
| | 1,2-unit bond content (mol %) | 22 |

As shown in Table 7 above, it could be confirmed that a liquid rubber having high selectivity on a trans-1,4 bond could be obtained in a high yield by using a small amount of the catalyst according to the present invention.

Experimental Example 3

With respect to the liquid rubbers obtained in Examples 3-1 to 3-3, the number average molecular weight, the weight average molecular weight, the molecular weight distribution, and the trans-1,4 bond content were measured by the same methods as in Experimental Example 1, and are shown in Table 8 below.

TABLE 8

|  |  | Example | | |
|---|---|---|---|---|
| Division | | 3-1 | 3-2 | 3-3 |
| Molecular weight | Mn(g/mol) | 2,576 | 2,685 | 1,195 |
| | Mw(g/mol) | 6,678 | 19,544 | 2,499 |
| | PDI | 2.59 | 7.2 | 2.09 |
| Bond type | trans-1,4 bond content (mol %) | >98 | >98 | >98 |
| | cis-1,4 bond content (mol %) | <1 | <1 | <1 |
| | 1,2-unit bond content (mol %) | <1 | <1 | <1 |

As shown in Table 8, it could be confirmed that a liquid rubber could be prepared using a small amount of the catalyst according to the present invention.

The invention claimed is:

1. A method for preparing a liquid rubber, the method comprising a step S10: performing polymerization reaction of a conjugated diene-based monomer in the presence of an organic solvent and a catalyst composition, wherein
the catalyst composition comprises a catalyst comprising a compound represented by the following Formula 1:

[Formula 1]

in Formula 1,
R is an alkyl group of 1 to 12 carbon atoms,
$R_1$ to $R_4$ are each independently a halogen group, or a substituted or unsubstituted alkyl group of 1 to 20 carbon atoms, and
o, p, q and r are each independently an integer of 1 to 5.

2. The method for preparing a liquid rubber according to claim 1, wherein $R_1$ to $R_4$ are each independently a halogen group, or a halogen-substituted alkyl group of 1 to 12 carbon atoms.

3. The method for preparing a liquid rubber according to claim 1, wherein an organic borate in the compound represented by Formula 1 is one or more selected from the group consisting of tetrakis(phenyl)borate, tetrakis(pentafluorophenyl)borate, tetrakis[3,5-bis(trifluoromethyl)phenyl]borate and derivatives thereof.

4. The method for preparing a liquid rubber according to claim 1, wherein the catalyst composition is comprised in 0.1 parts by weight or less based on an amount of 100 parts by weight of the organic solvent and the conjugated diene-based monomer.

5. The method for preparing a liquid rubber according to claim 1, wherein the step S10 of polymerization is performed by comprising an aromatic vinyl-based monomer.

6. The method for preparing a liquid rubber according to claim 1, where prior to the step S10, further comprising a step S1: performing polymerization reaction of an aromatic vinyl-based monomer in the presence of the organic solvent and the catalyst composition.

7. The method for preparing a liquid rubber according to claim 1, wherein the catalyst composition further comprises a halogenated hydrocarbon solvent.

8. The method for preparing a liquid rubber according to claim 1, wherein the conjugated diene-based monomer is one or more selected from the group consisting of 1,3-butadiene, 2,3-dimethyl-1,3-butadiene, piperylene, 3-butyl-1,3-octadiene, isoprene and 2-phenyl-1,3-butadiene.

9. The method for preparing a liquid rubber according to claim 1, wherein the catalyst composition comprises an aluminum-based cocatalyst.

10. The method for preparing a liquid rubber according to claim 9, wherein the aluminum-based cocatalyst is one or more selected from aluminum-based compounds represented by the following Formula 2 to Formula 4:

[Formula 2]
[Formula 3]
[Formula 4]

in Formulae 2 to 4,
$R_a$, $R_5$ and $R_6$ are each independently a monovalent hydrocarbon group of 1 to 20 carbon atoms,
Z is a halogen group,
m is an integer of 0 to 3, and
a and b are each independently an integer of 1 to 100.

11. The method for preparing a liquid rubber according to claim 9, wherein a weight ratio of the catalyst comprising the compound represented by Formula 1 and the aluminum-based cocatalyst is 1:0.1 to 1:50.

12. The method for preparing a liquid rubber according to claim 9, wherein the aluminum-based cocatalyst is one or more selected from the group consisting of methylaluminoxane, modified methylaluminoxane, trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, tri-2-ethylhexylaluminum, dimethylaluminum chloride, diethylaluminum chloride, diisopropylaluminum chloride, diisobutylaluminum chloride, dimethylaluminum bromide, methylaluminum dichloride, ethylaluminum dichloride, isopropylaluminum dichloride, aluminum chloride and ethylaluminum dibromide.

13. The method for preparing a liquid rubber according to claim 12, wherein the modified methylaluminoxane is a compound represented by Formula 5 below,

[Formula 5]

wherein $R_7$ is a monovalent hydrocarbon group of 1 to 20 carbon atoms, c and d are each independently an integer of 2 or more, and Me represents a methyl group.

* * * * *